(12) United States Patent
Manabe et al.

(10) Patent No.: US 8,809,458 B2
(45) Date of Patent: Aug. 19, 2014

(54) POLYSILOXANE COMPOSITION

(75) Inventors: Takao Manabe, Settsu (JP); Satoshi Sugiyama, Settsu (JP); Makoto Seino, Settsu (JP); Mitsuhiro Hori, Settsu (JP)

(73) Assignee: Kaneka Corporation, Osaka (JP)

( * ) Notice: Subject to any disclaimer, the term of this patent is extended or adjusted under 35 U.S.C. 154(b) by 740 days.

(21) Appl. No.: 12/312,641

(22) PCT Filed: Nov. 29, 2007

(86) PCT No.: PCT/JP2007/073056
§ 371 (c)(1),
(2), (4) Date: May 20, 2009

(87) PCT Pub. No.: WO2008/066116
PCT Pub. Date: Jun. 5, 2008

(65) Prior Publication Data
US 2010/0063221 A1  Mar. 11, 2010

(30) Foreign Application Priority Data

Dec. 1, 2006 (JP) .................................. 2006-325556
Apr. 19, 2007 (JP) .................................. 2007-110304

(51) Int. Cl.
| C08G 77/04 | (2006.01) |
| C08G 77/18 | (2006.01) |
| C09D 183/08 | (2006.01) |
| C09D 183/04 | (2006.01) |
| G02B 1/04 | (2006.01) |

(52) U.S. Cl.
CPC ............... *C09D 183/04* (2013.01); *G02B 1/04* (2013.01); *C08G 77/18* (2013.01); *C08G 77/04* (2013.01); *C08G 77/045* (2013.01)
USPC .......................................... 525/100; 525/474

(58) Field of Classification Search
USPC .................................................. 525/100, 474
See application file for complete search history.

(56) References Cited

U.S. PATENT DOCUMENTS

| 6,767,983 | B1 | 7/2004 | Fujiyama et al. |
| 2002/0086223 | A1* | 7/2002 | Hattori et al. ..................... 430/5 |
| 2006/0088787 | A1* | 4/2006 | Gonsalves et al. ......... 430/281.1 |
| 2006/0224009 | A1* | 10/2006 | Hamada et al. ............... 556/466 |
| 2009/0012317 | A1* | 1/2009 | Laine et al. ................... 549/215 |

FOREIGN PATENT DOCUMENTS

| JP | 2001-172514 | 6/2001 |
| JP | 2004-238589 | 8/2004 |
| JP | 2004-529984 | 9/2004 |
| JP | 2004-359933 | 12/2004 |
| WO | 02/100867 | 12/2002 |

OTHER PUBLICATIONS

International Search Report dated Jan. 15, 2008 in the International (PCT) Application PCT/JP2007/073056 of which the present application is the U.S. National Stage.
English abstract of JP 2002-363414 published Dec. 18, 2002.
English abstract of JP 2006-269402 published Oct. 5, 2006.
English abstract of JP 02-067290 published Mar. 7, 1990.
English abstract of JP 06-329687 published Nov. 29, 1994.
English abstract of JP 2006-036898 published Feb. 9, 2006.
English abstract of JP 2006-163157 published Jun. 22, 2006.
English abstract of JP 2000-313744 published Nov. 14, 2000.
English abstract of JP 2007-140444 published Jun. 7, 2007.
English abstract of JP 2007-070600 published Mar. 22, 2007.
English abstract of JP 2007-291272 published Nov. 8, 2007.
English abstract of JP 2007-291273 published Nov. 8, 2007.
English abstract of JP 2007-293159 published Nov. 8, 2007.
English abstract of JP 2007-293160 published Nov. 8, 2007.
Translation of PCT Written Opinion in the International (PCT) Application PCT/JP2007/073056 of which the present application is the U.S. National Stage.

\* cited by examiner

*Primary Examiner* — Ling Choi
*Assistant Examiner* — Chun-Cheng Wang
(74) *Attorney, Agent, or Firm* — Wenderoth, Lind & Ponack, L.L.P.

(57) ABSTRACT

A polysiloxane composition having high transparency, while being excellent in heat resistance and light resistance is provided. The polysiloxane composition is composed of (A) a polysiloxane which is a polysiloxane compound having a polyhedral skeleton having 6 to 24 silicon atoms in its molecule and which has at least one group containing a hydrolyzable silyl group bonded to a Si atom constituting the polyhedral skeleton, and (B) a photoacid generator. The hydrolyzable silyl group is preferably an alkoxysilyl group.

14 Claims, No Drawings

POLYSILOXANE COMPOSITION

RELATED APPLICATION

This application is a 371 application of PCT application PCT/JP2007/073056 filed on Nov. 29, 2007, claiming priority based on Japanese Application No. 2006-325556 filed on Dec. 1, 2006, and Japanese Application No. 2007-110304 filed on Apr. 19, 2007, the contents of which are incorporated herein by reference in their entirety.

TECHNICAL FIELD

The present invention relates to a polysiloxane composition having high transparency, while being excellent in heat resistance and light resistance, and an optical member including the composition.

BACKGROUND ART

As a curable composition containing a polysiloxane including a photoacid generator, for example, Patent Document 1 discloses a study on the use of a silicone resin having an epoxy group. However, in general, a polyether structure produced by polymerization of epoxy groups is poor in heat resistance, and thus a cured product composed of a curable composition having an epoxy group has a problem in terms of heat resistance and light resistance. Consequently, in particular, development of a heat- and light-resistant resin having transparency has been strongly desired.

Furthermore, curable compositions containing a polysiloxane having a polyhedral structure containing an epoxy group have also been disclosed (Patent Documents 2 and 3). However, in these techniques, although a polysiloxane having a polyhedral structure is essentially used, many hydrocarbon units (spacers composed of an alkylene chain) are present between epoxy groups and a polysiloxane skeleton constituting a polyhedral structure, and a polyether structure produced by polymerization of epoxy groups is poor in heat resistance and light resistance. Therefore, a further improvement has been desired.

Meanwhile, for example, Patent Document 4 discloses a photocrosslinkable composition containing a compound having a hydrolyzable silyl group in its molecule. In this technique, a main chain structure thereof does not necessarily have good heat resistance or light resistance, and thus an improvement has been desired.

Patent Document 1: Japanese Unexamined Patent Application Publication No. 2004-238589
Patent Document 2: Japanese Unexamined Patent Application Publication (Translation of PCT Application) No. 2004-529984
Patent Document 3: Japanese Unexamined Patent Application Publication No. 2004-359933
Patent Document 4: Japanese Unexamined Patent Application Publication No. 2001-172514

DISCLOSURE OF INVENTION

Problems to be Solved by the Invention

It is an object of the present invention to provide a polysiloxane composition in which the above problems are solved and which has high transparency, while being excellent in heat resistance and light resistance.

Means for Solving the Problems

As a result of intensive studies for solving the above problems, the inventors of the present invention have found that the problems can be solved by the following constitution:

1). A polysiloxane composition including:
(A) a polysiloxane which is a polysiloxane compound having a polyhedral skeleton and which has at least one group containing a hydrolyzable silyl group bonded to a Si atom constituting the polyhedral skeleton; and
(B) a photoacid generator.

2). The polysiloxane composition described in 1),
wherein the polysiloxane compound (A) having the polyhedral skeleton is a polysiloxane compound having a polyhedral skeleton having 6 to 24 Si atoms in its molecule.

3). The polysiloxane composition described in 1) or 2), wherein the hydrolyzable silyl group in the component (A) is an alkoxysilyl group.

4). The polysiloxane composition described in any one of 1) to 3), wherein the group containing an alkoxysilyl group in the component (A) is an alkoxysilylethyl group or an alkoxysilylpropyl group.

5). The polysiloxane composition described in any one of 1) to 4), wherein the group containing an alkoxysilyl group in the component (A) is at least one group containing an alkoxysilyl group selected from the group consisting of an (alkoxysilylethyl)dimethylsilyl group, an (alkoxysilylethyl)diphenylsilyl group, an (alkoxysilylpropyl)dimethylsilyl group, and an (alkoxysilylpropyl)diphenyl group.

6). The polysiloxane composition described in any one of 1) to 5), wherein the polysiloxane compound (A) having the polyhedral skeleton is obtained by reacting a polyhedral-structured polysiloxane compound having functional groups that can react with components (1) and (2) below:
(1) a compound having one functional group that can react with the component (A) and at least one hydrolyzable silyl group,
(2) a compound that has two or more functional groups that can react with the component (A), with these compounds.

7). The polysiloxane composition described in any one of 1) to 6), wherein the polyhedral-structured polysiloxane compound in the component (A) is a polyhedral-structured silylated silicic acid compound.

8). The polysiloxane composition described in any one of 1) to 7), wherein each of the functional groups that can react with components (1) and (2) in the component (A) is an alkenyl group or a hydrosilyl group.

9). The polysiloxane composition described in any one of 1) to 8), wherein the hydrolyzable silyl group in the component (1) is an alkoxysilyl group.

10). The polysiloxane composition described in any one of 1) to 9), wherein the functional groups that can react with the component (A) in the component (2) are bonded to both ends of the compound.

11). The polysiloxane composition described in any one of 1) to 10), wherein the component (2) is at least one selected from the group consisting of polyalkylenes, polyisobutylene, polyesters, polybutyl acrylate, polyethers, polyamides, polyimides, and polysiloxanes.

12). The polysiloxane composition described in any one of 1) to 11), wherein a reaction between the component (A) and the components (1) and (2) is conducted by a hydrosilylation reaction.

13). The polysiloxane composition described in anyone of 1) to 12), wherein the photoacid generator is an onium salt.

14). An optical member including the polysiloxane composition described in any one of 1) to 13).

Advantages

According to the present invention, a polysiloxane composition and an optical member that have high transparency, while being excellent in heat resistance and light resistance can be provided.

BEST MODES FOR CARRYING OUT THE INVENTION

The present invention will now be described in detail.

The present invention relates to a polysiloxane composition composed of (A) a polysiloxane which is a polysiloxane compound having a polyhedral skeleton and which has at least one group containing a hydrolyzable silyl group bonded to a Si atom constituting the polyhedral skeleton and (B) a photoacid generator, and an optical member including the composition.

<(A) Polysiloxane Having Polyhedral Skeleton>

The component (A) in the present invention is a polysiloxane which has at least one group containing a hydrolyzable silyl group bonded to a Si atom constituting a polyhedral skeleton. A polysiloxane compound having a polyhedral skeleton having 6 to 24 Si atoms in its molecule is preferable.

Specifically for example, the component (A) in the present invention can be synthesized by a hydrosilylation addition reaction between a polysiloxane (Compound I) which is a polysiloxane compound having a polyhedral skeleton having preferably 6 to 24 Si atoms in its molecule and which has at least one alkenyl group bonded directly or indirectly to a Si atom constituting the polyhedral skeleton and a hydrosilane compound (Compound II) having a hydrolyzable silyl group, or between a polysiloxane (Compound III) which is a polysiloxane compound having a polyhedral skeleton having preferably 6 to 24 Si atoms in its molecule and which has at least one hydrosilyl group bonded directly or indirectly to a Si atom constituting the polyhedral skeleton and an alkenyl compound (IV) having a hydrolyzable silyl group.

Alternatively, the component (A) may be a compound which is a polyhedral-structured polysiloxane having functional groups that can react with components (1) and (2) described below, and which is obtained by reacting with (1) and (2).

The alkenyl group-containing polysiloxane (Compound I) will now be described.

In the alkenyl group-containing polysiloxane (Compound I) used in the present invention, the number of Si atoms contained in the polyhedral skeleton is preferably 6 to 24. Specifically, for example, silsesquioxanes having a polyhedral structure represented by the following structure are exemplified (here, a typical example in which the number of Si atoms=8 is exemplified).

[Chem. 1]

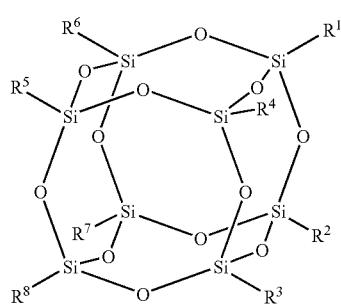

In the above formula, $R^1$ to $R^8$ are the same or different, unsubstituted or substituted, monovalent hydrocarbon groups having preferably 1 to 20 carbon atoms more preferably 1 to 10 carbon atoms and selected from alkenyl groups such as a vinyl group, an allyl group, a butenyl group, and a hexenyl group; organic groups containing a (meth)acryloyl group, an epoxy group, a mercapto group, or an amino group; a hydrogen atom; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like.

However, at least one of $R^1$ to $R^8$ is an alkenyl group. The alkenyl group is preferably a vinyl group from the standpoint of heat resistance. When a group other than an alkenyl group is selected, a methyl group is preferable from the standpoint of heat resistance.

Each of the above silsesquioxanes having the polyhedral structure is obtained by, for example, a hydrolytic condensation reaction of a silane compound represented by $RSiX_3$ (wherein R represents the above-described $R^1$ to $R^8$, and X represents a hydrolyzable functional group such as a halogen atom, an alkoxy group, or the like). Another known method of synthesizing a silsesquioxane having a polyhedral skeleton includes synthesizing a trisilanol compound having three silanol groups in its molecule by a hydrolytic condensation reaction of $RSiX_3$, and then further reacting the same or a different trifunctional silane compound to close a ring.

In the alkenyl group-containing polysiloxane (Compound I) in the present invention, as further preferable examples, silylated silicic acids having a polyhedral structure represented by the following structure are exemplified (here, a typical example in which the number of Si atoms=8 is exemplified). In such compounds, a Si atom constituting a polyhedral skeleton is bonded to an alkenyl group via a siloxane bond. Accordingly, a resulting cured product is not excessively rigid, and a satisfactory formed body can be produced.

[Chem. 2]

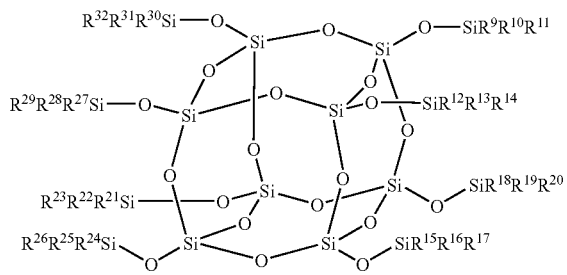

In the above structure, $R^9$ to $R^{32}$ are the same or different organic groups selected from alkenyl groups such as a vinyl group, an allyl group, a butenyl group, and a hexenyl group; organic groups containing a (meth)acryloyl group, an epoxy group, a mercapto group, or an amino group; a hydrogen atom; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like. However, at least one of $R^9$ to $R^{32}$ is an alkenyl group. The alkenyl group is preferably a vinyl group from the standpoint of heat resistance. When a group other than an alkenyl group is selected, a methyl group is preferable from the standpoint of heat resistance and light resistance.

A method of synthesizing such a silylated silicic acid having a polyhedral structure is not particularly limited, and the silylated silicic acid is synthesized by a known method. A specific example of the synthetic method is a method in which hydrolytic condensation of a tetraalkoxysilane such as tetraethoxysilane is conducted in the presence of a base such as a quaternary ammonium hydroxide.

In this synthetic method, a silicate having a polyhedral structure is obtained by a hydrolytic condensation reaction of a tetraalkoxysilane, and by reacting the resulting silicate with a silylating agent such as an alkenyl group-containing silyl chloride, a polysiloxane having a polyhedral structure in which a Si atom constituting the polyhedral structure is bonded to an alkenyl group via a siloxane bond can be obtained. In the present invention, a silylated silicic acid having the same polyhedral structure can be obtained from silica or a substance containing silica, such as rice hulls, instead of a tetraalkoxysilane.

In the present invention, the number of Si atoms contained in the polyhedral skeleton is preferably 6 to 24 and further preferably 6 to 10. A mixture of polysiloxanes having polyhedral skeletons containing different numbers of Si atoms may be used.

Furthermore, in the present invention, the number of alkenyl groups contained per molecule is preferably at least one, more preferably at least two, and further preferably at least three. Next, the hydrolyzable silyl group-containing hydrosilane compound (Compound II) will now be described.

The hydrolyzable silyl group-containing hydrosilane compound (Compound II) in the present invention is not particularly limited as long as the compound has a hydrolyzable silyl group and a hydrosilyl group in its molecule.

Specific examples thereof include, but are not limited to, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane and phenyldiacetoxysilane; and ketoxymatesilanes such as bis(dimethylketoxymate)methylsilane, and bis(cyclohexylketoxymate)methylsilane. Among these, in particular, alkoxysilanes can be preferably used.

The hydrosilyl group-containing polysiloxane (Compound III) will now be described. In the hydrosilyl group-containing polysiloxane (Compound III) used in the present invention, the number of Si atoms contained in the polyhedral skeleton is preferably 6 to 24. Specifically, for example, silsesquioxanes having a polyhedral structure represented by the following structure are exemplified (here, a typical example in which the number of Si atoms=8 is exemplified).

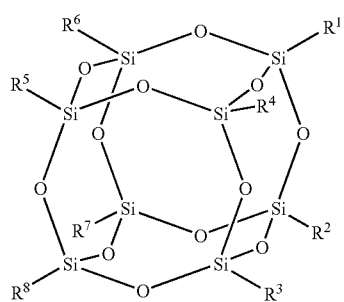

[Chem. 3]

In the above formula, $R^1$ to $R^8$ are the same or different, unsubstituted or substituted, monovalent hydrocarbon groups having preferably 1 to 20 carbon atoms more preferably 1 to 10 carbon atoms and selected from alkenyl groups such as a vinyl group, an allyl group, a butenyl group, and a hexenyl group; organic groups containing a (meth)acryloyl group, an epoxy group, a mercapto group, or an amino group; a hydrogen atom; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like.

However, at least one of $R^1$ to $R^8$ is a hydrogen atom.

Each of the above silsesquioxanes having the polyhedral structure is obtained by, for example, a hydrolytic condensation reaction of a silane compound represented by $RSiX_3$ (wherein R represents the above-described $R^1$ to $R^8$, and X represents a hydrolyzable functional group such as a halogen atom, an alkoxy group, or the like). Another known method of synthesizing a silsesquioxane having a polyhedral skeleton includes synthesizing a trisilanol compound having three silanol groups in its molecule by a hydrolytic condensation reaction of $RSiX_3$, and then further reacting the same or a different trifunctional silane compound to close a ring.

In the hydrosilyl group-containing polysiloxane (Compound III) in the present invention, as further preferable examples, silylated silicic acids having a polyhedral structure represented by the following structure are exemplified (here, a typical example in which the number of Si atoms=8 is exemplified). In such compounds, a Si atom constituting a polyhedral skeleton is bonded to a hydrosilane group which is a reactive group via a siloxane bond. Accordingly, a resulting cured product is not excessively rigid, and a satisfactory formed body can be produced.

[Chem. 4]

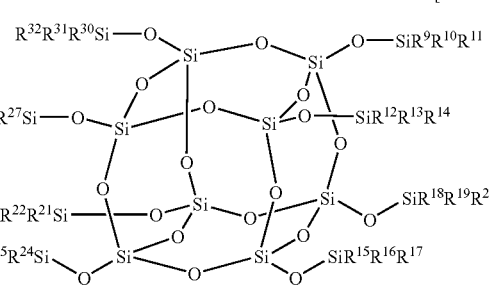

In the above structure, $R^9$ to $R^{32}$ are the same or different organic groups selected from alkenyl groups such as a vinyl group, an allyl group, a butenyl group, and a hexenyl group; organic groups containing a (meth)acryloyl group, an epoxy group, a mercapto group, or an amino group; a hydrogen atom; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like. However, at least one of $R^9$ to $R^{32}$ is a hydrogen atom.

A method of synthesizing such a silylated silicic acid having a polyhedral structure is not particularly limited, and the silylated silicic acid is synthesized by a known method. A specific example of the synthetic method is a method in which hydrolytic condensation of a tetraalkoxysilane such as tetraethoxysilane is conducted in the presence of a base such as a quaternary ammonium hydroxide.

In this synthetic method, a silicate having a polyhedral structure is obtained by a hydrolytic condensation reaction of a tetraalkoxysilane, and by reacting the resulting silicate with a silylating agent such as a hydrosilyl group-containing silyl chloride, a polysiloxane in which a Si atom constituting a polyhedral structure is bonded to a hydrosilyl group via a siloxane bond can be obtained. In the present invention, a silylated silicic acid having the same polyhedral structure can be obtained from silica or a substance containing silica, such as rice hulls, instead of a tetraalkoxysilane.

In the present invention, the number of Si atoms contained in the polyhedral skeleton is preferably 6 to 24 and further preferably 6 to 10. A mixture of polysiloxanes having polyhedral skeletons containing different numbers of Si atoms may be used.

Furthermore, in the present invention, the number of hydrosilyl groups contained per molecule is preferably at least one, more preferably at least two, and further preferably at least three.

Next, the hydrolyzable silyl group-containing alkenyl compound (Compound IV) will now be described.

The hydrolyzable silyl group-containing alkenyl compound (Compound IV) in the present invention is not particularly limited as long as the compound has a hydrolyzable silyl group and an alkenyl group in its molecule.

Specific examples thereof include, but are not limited to, halogenated silanes such as trichlorovinylsilane, methyldichlorovinylsilane, dimethylchlorovinylsilane, and phenyldichlorovinylsilane; alkoxysilanes such as trimethoxyvinylsilane, triethoxyvinylsilane, methyldiethoxyvinylsilane, methyldimethoxyvinylsilane, and phenyldimethoxyvinylsilane; acyloxysilanes such as methyldiacetoxyvinylsilane and phenyldiacetoxyvinylsilane; and ketoxymatesilanes such as bis(dimethylketoxymate)methylvinylsilane, and bis(cyclohexylketoxymate)methylvinylsilane. Among these, in particular, alkoxysilanes are preferably used.

In the present invention, the component (A) can be produced by a hydrosilylation addition reaction between Compound I and Compound II or between Compound III and Compound IV.

In the hydrosilylation reaction, a transition metal catalyst is usually used. Examples of the transition metal catalyst include platinum-olefin complexes, chloroplatinic acid, elemental platinum, solid platinum supported on a carrier (such as alumina, silica, or carbon black); platinum-vinyl siloxane complexes such as $Pt_n(ViMe_2SiOSiMe_2Vi)_n$ and $Pt[(MeViSiO)_4]_m$; platinum-phosphine complexes such as $Pt(PPh_3)_4$ and $Pt(PBu_3)_4$; platinum-phosphite complexes such as $Pt[P(OPh)_3]_4$ and $Pt[P(OBu)_3]_4$ (wherein Me represents a methyl group, Bu represents a butyl group, Vi represents a vinyl group, Ph represents a phenyl group, and n and m each represent an integer), $Pt(acac)_2$, platinum-hydrocarbon complexes described in the specifications of U.S. Pat. Nos. 3,159,601 and 3,159,662 by Ashby et al., and platinum-alcoholate catalysts described in the specification of U.S. Pat. No. 3,220,972 by Lamoreaux et al.

Examples of catalysts other than platinum compounds include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, and $TiCl_4$. These catalysts may be used alone or in combinations of two or more. In terms of catalytic activity, chloroplatinic acid, platinum-olefin complexes, platinum-vinyl siloxane complexes, and $Pt(acac)_2$, and the like are preferred.

<Polyhedral-Structured Polysiloxane Compound Having Functional Groups that can React with (1) and (2)>

Specifically, a polyhedral-structured polysiloxane compound having functional groups that can react with (1) and (2) is a compound in which groups containing functional groups that can react with components (1) and (2) are bonded to Si atoms of a polysiloxane having a polyhedral structure having Si atoms, preferably a polyhedral structure having 6 to 24 Si atoms.

In the polyhedral-structured polysiloxane compound having functional groups that can react with (1) and (2) and used in the present invention, the number of Si atoms contained in a polyhedral skeleton is preferably 6 to 24. Specifically, for example, silsesquioxanes having a polyhedral structure represented by the following structure are exemplified (here, a typical example in which the number of Si atoms=8 is exemplified).

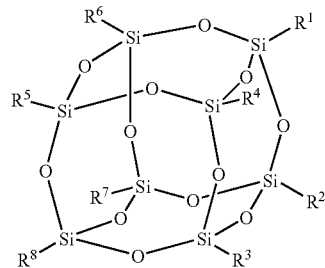

[Chem. 5]

In the above formula, $R^1$ to $R^8$ are the same or different, unsubstituted or substituted, monovalent hydrocarbon groups having preferably 1 to 20 carbon atoms more preferably 1 to 10 carbon atoms and selected from alkenyl groups such as a vinyl group, an allyl group, a butenyl group, and a hexenyl group; organic groups containing a (meth)acryloyl group, an epoxy group, a mercapto group, or an amino group; a hydrogen atom; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like.

Each of the above silsesquioxanes having the polyhedral structure is obtained by, for example, a hydrolytic condensation reaction of a silane compound represented by $RSiX_3$ (wherein R represents the above-described $R^1$ to $R^8$, and X represents a hydrolyzable functional group such as a halogen atom, an alkoxy group, or the like). Another known method of synthesizing a silsesquioxane having a polyhedral skeleton includes synthesizing a trisilanol compound having three silanol groups in its molecule by a hydrolytic condensation reaction of $RSiX_3$, and then further reacting the same or a different trifunctional silane compound to close a ring.

In the polyhedral-structured polysiloxane compound having functional groups that can react with (1) and (2) in the present invention, as further preferable examples, silylated silicic acids having a polyhedral structure represented by the following structure are exemplified (here, a typical example in which the number of Si atoms=8 is exemplified). In such compounds, Si atoms constituting a polyhedral skeleton are bonded to the functional groups that can react with (1) and (2) via siloxane bonds. Accordingly, a resulting cured product is not excessively rigid, and a satisfactory formed body can be produced.

[Chem. 6]

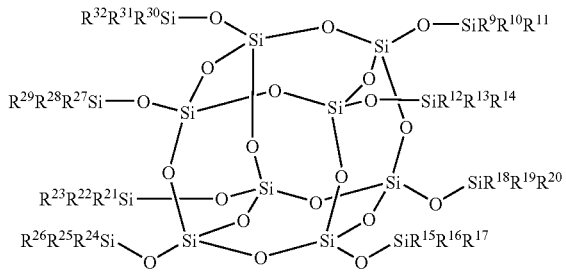

In the above structure, $R^9$ to $R^{32}$ are the same or different organic groups selected from alkenyl groups such as a vinyl group, an allyl group, a butenyl group, and a hexenyl group; organic groups containing a (meth)acryloyl group, an epoxy group, a mercapto group, or an amino group; a hydrogen atom; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like.

A method of synthesizing such a silylated silicic acid having a polyhedral structure is not particularly limited, and the silylated silicic acid is synthesized by a known method. A specific example of the synthetic method is a method in which hydrolytic condensation of a tetraalkoxysilane such as tetraethoxysilane is conducted in the presence of a base such as a quaternary ammonium hydroxide.

In this synthetic method, a silicate having a polyhedral structure is obtained by a hydrolytic condensation reaction of a tetraalkoxysilane, and by reacting the resulting silicate with a silylating agent such as a silyl chloride having functional groups that can react with (1) and (2), a polysiloxane in which Si atoms constituting the polyhedral structure are bonded to the functional groups that can react with (1) and (2) via siloxane bonds can be obtained. In the present invention, a silylated silicic acid having the same polyhedral structure can be obtained from silica or a substance containing silica, such as rice hulls, instead of a tetraalkoxysilane.

In the present invention, the number of Si atoms contained in the polyhedral skeleton is preferably 6 to 24 and further preferably 6 to 10. A mixture of polysiloxanes having polyhedral skeletons containing different numbers of Si atoms may be used.

<Compound (1)>

A component (1) of the present invention is a compound that has one functional group that can react with the polyhedral-structured polysiloxane compound having functional groups that can react with (1) and (2) and at least one hydrolyzable silyl group, and that is different from the component (A) and a component (2).

The hydrolyzable silyl group causes a cross-linking reaction by an irradiation of a light beam in the presence of a photoacid generator, thereby providing a cured product of the component (A).

Examples of the functional group that can react with the polyhedral-structured polysiloxane compound having functional groups that can react with (1) and (2) include alkenyl groups such as a vinyl group, an allyl group, and a propenyl group; a hydrosilyl group; a (meth)acryloyl group; an epoxy group; a mercapto group; and halogen groups. A functional group other than hydrolyzable silyl groups is preferable. In particular, from the standpoint of heat resistance and light resistance, an alkenyl group or a hydrosilyl group is preferable. Among alkenyl groups, a vinyl group is preferable.

Examples of the hydrolyzable silyl group include alkoxysilyl groups such as a methoxysilyl group, an ethoxysilyl group, and a propoxysilyl group; acetoxysilyl groups; and halogenated silyl groups such as a chlorosilyl group and a bromosilyl group. Among these, an alkoxysilyl group or an acetoxysilyl group is preferable. In particular, an alkoxysilyl group represented by

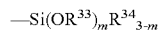

(wherein $R^{33}$ represents an alkyl group having 1 to 6 carbon atoms, $R^{34}$ represents an alkyl group or aryl group having 1 to 6 carbon atoms, $R^{33}$ and $R^{34}$ may be the same group or different groups, and m represents an integer of 1 to 3) is preferable.

In the case where a hydrosilyl group is used as the functional group that can react with the component (A), the hydrosilyl group and the hydrolyzable silyl group are preferably bonded to the same silicon atom. Specifically, a compound having a structural formula of

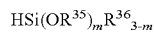

(wherein $R^{35}$ represents an alkyl group having 1 to 6 carbon atoms, $R^{36}$ represents an alkyl group or aryl group having 1 to 6 carbon atoms, $R^{35}$ and $R^{36}$ may be the same group or different groups, and m represents an integer of 1 to 3) is preferably used.

In the case where an alkenyl group is used as the functional group that can react with the component (A), the alkenyl group and the hydrolyzable silyl group are preferably bonded to the same silicon atom. Specifically, a compound having a structural formula of

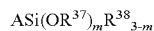

(wherein A represents an alkenyl group, $R^{37}$ represents an alkyl group having 1 to 6 carbon atoms, $R^{38}$ represents an alkyl group or aryl group having 1 to 6 carbon atoms, $R^{37}$ and $R^{38}$ may be the same group or different groups, and m represents an integer of 1 to 3) is preferably used.

<Compound (2)>

A component (2) of the present invention is a compound that has two or more functional groups that can react with the component (A), and that is different from the component (A) and the component (1). Examples of the functional groups that can react with the component (A) include alkenyl groups such as a vinyl group, an allyl group, and a propenyl group; a hydrosilyl group; a (meth)acryloyl group; an epoxy group; a mercapto group; and organic groups having a halogen group or the like. From the standpoint of heat resistance and light resistance, an alkenyl group or a hydrosilyl group is preferable.

Among alkenyl groups, a vinyl group is preferable. In addition, the component (2) is preferably a compound composed of a dimer or higher polymer in which monomers are bonded to each other. Specifically, polyalkylenes, polyisobutylene, polyesters, polybutyl acrylate, polyethers, polyamides, polyimides, and polysiloxanes are exemplified. Compounds in which an alkenyl group, preferably, a vinyl group, or a hydrosilyl group is bonded to any of these are preferable. These may be used alone or in combinations of two or more. Furthermore, from the standpoint of heat resistance and light resistance, polysiloxanes are preferable, and polysiloxanes having a hydrosilyl group or an alkenyl group at an end thereof are preferable.

Note that the component (2) is a compound that is different from the polyhedral-structured polysiloxane compound having functional groups that can react with (1) and (2), and the compound (1), and is preferably a compound that does not have a polyhedral-structured polysiloxane structure. Here, a compound having hydrosilyl groups at the ends thereof is exemplified as a typical example. A compound having alkenyl groups at the ends thereof is a compound in which hydrogen atoms disposed at the end portions are replaced with the alkenyl groups.

[Chem. 7]

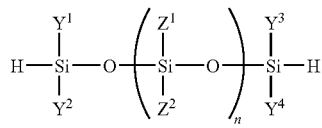

In the above formula, $Y^1$ to $Y^4$ and $Z^1$ and $Z^2$ are the same or different, unsubstituted or substituted, monovalent hydrocarbon groups having preferably 1 to 20 carbon atoms more preferably 1 to 10 carbon atoms and selected from organic groups containing a (meth)acryloyl group, an epoxy group, a mercapto group, or an amino group; alkyl groups such as a methyl group, an ethyl group, a propyl group, and a butyl group; cycloalkyl groups such as a cyclohexyl group; aryl groups such as a phenyl group and a tolyl group; and these groups in each of which some of or all of hydrogen atoms bonded to carbon atoms are each substituted with a halogen atom, a cyano group, or the like, such as a chloromethyl group, a trifluoropropyl group, and a cyanoethyl group; and the like. n is preferably 0 to 1,000, particularly preferably 0 to 200, and further preferably 0 to 100.

As each of the structures of $Y^1$ to $Y^4$ and $Z^1$ and $Z^2$, an alkyl group or an aryl group is preferably used. In particular, from the standpoint of heat resistance, a methyl group or a phenyl group is preferably used. In addition, the substituents $Y^1$ to $Y^4$ and $Z^1$ and $Z^2$ may be all the same substituent or different substituents.

The component (2) can be bonded to reactive groups of the above-described polyhedral-structured polysiloxane at a plurality of positions using the two or more reactive functional groups present in the component (2). By appropriately incorporating the component (2) in the component (A), the brittleness of a cured product is improved, and an improvement in the toughness of the cured product can be expected. Furthermore, this incorporation also has an effect of improving a coating property when a thin film is formed on a substrate.

The component (A) of the present invention can be obtained by reacting reactive groups of the above-described polyhedral-structured polysiloxane with reactive groups of the components (1) and (2).

Various types of reactions can be performed in accordance with a combination between the reactive group of the polyhedral-structured polysiloxane and the reactive group of the component (1) or the reactive group of the polysiloxane compound and the reactive groups of the component (2). Examples thereof include a hydrosilylation addition reaction between an alkenyl group and a hydrosilyl group, an addition reaction between an alkenyl group and a mercapto group, and an addition reaction between an alkenyl group and a halogenated alkyl group. Among these, a hydrosilylation addition reaction between an alkenyl group and a hydrosilyl group is preferably used in which the reaction relatively easily occurs, the resulting bonding portions have high heat resistance, and the reactants have high stability.

In the hydrosilylation reaction, a transition metal catalyst is usually used. Examples of the transition metal catalyst include platinum-olefin complexes, chloroplatinic acid, elemental platinum, solid platinum supported on a carrier (such as alumina, silica, or carbon black); platinum-vinyl siloxane complexes such as $Pt_n(ViMe_2SiOSiMe_2Vi)_n$ and $Pt[(MeViSiO)_4]_m$; platinum-phosphine complexes such as $Pt(PPh_3)_4$ and $Pt(PBu_3)_4$; platinum-phosphite complexes such as $Pt[P(OPh)_3]_4$ and $PT[P(OBu)_3]_4$ (wherein Me represents a methyl group, Bu represents a butyl group, Vi represents a vinyl group, Ph represents a phenyl group, and n and m each represent an integer), $Pt(acac)_2$, platinum-hydrocarbon complexes described in the specifications of U.S. Pat. Nos. 3,159,601 and 3,159,662 by Ashby et al., and platinum-alcoholate catalysts described in the specification of U.S. Pat. No. 3,220,972 by Lamoreaux et al.

Examples of catalysts other than platinum compounds include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, and $TiCl_4$. These catalysts may be used alone or in combinations of two or more. In terms of catalytic activity, chloroplatinic acid, platinum-olefin complexes, platinum-vinyl siloxane complexes, and $Pt(acac)_2$, and the like are preferred.

In this reaction, the component (1) is preferably used in a ratio in which the functional group of the component (1) is 0.1 to 1.5 mol, further preferably 0.3 to 0.9 mol, relative to 1 mol of reactive groups of the polyhedral-structured polysiloxane compound.

The component (2) is preferably used in an amount of 1 to 200 parts by weight, further preferably 5 to 100 parts by weight relative to 100 parts by weight of the compound.

In this reaction, an excessively small amount of component (2) may not be preferable because the resulting cured product has poor toughness. An excessively large amount of component (2) may not be preferable because the compound is excessively cross-linked by the component (2), thereby causing gelation of the component (A), and formability of the resulting composition is significantly degraded.

Next, a photoacid generator used as the component (B) will be described. The photoacid generator is a compound that can emit an acidic active substance capable of cross-linking cross-linkable silyl groups when irradiated with active energy rays such as visible light, ultraviolet rays, infrared rays, X-rays, α-rays, β-rays, and γ-rays.

The pKa of an acid generated by the photoacid generator is not limited, but preferably less than 3, further preferably less than 1.

A known photoacid generator can be used as the photoacid generator that can be used in a composition of the present invention. Examples thereof include various types of compounds that are cited as suitable photoacid generators in Japanese Unexamined Patent Application Publication No. 2000-1648, Japanese Unexamined Patent Application Publication (Translation of PCT Application) No. 2001-515533, and PCT Publication No. WO/2002-83764, but the present invention is not particularly limited thereto. Examples of the photoacid generator that can be preferably used in the present invention include sulfonic acid derivatives, onium salts, carboxylates.

Examples of the sulfonic acid derivatives that can be used in the present invention include disulfones, disulfonyldiazomethanes, disulfonylmethanes, sulfonylbenzoylmethanes, imidosulfonates such as a trifluoromethylsulfonate derivative, benzoin sulfonates, sulfonates of 1-oxy-2-hydroxy-3-propylalcohol, pyrogallol trisulfonates, and benzyl sulfonates.

Specific examples thereof include diphenyl disulfone, ditosyl disulfone, bis(phenylsulfonyl)diazomethane, bis(chlorophenylsulfonyl)diazomethane, bis(xylylsulfonyl)diazomethane, phenylsulfonyl benzoyl diazomethane, bis(cyclohexylsulfonyl)methane, 1,8-naphthalene dicarboxylic acid imide methylsulfonate, 1,8-naphthalene dicarboxylic acid imide tosylsulfonate, 1,8-naphthalene dicarboxylic acid imide trifluoromethylsulfonate, 1,8-naphthalene dicarboxylic acid imide camphorsulfonate, succinimide phenylsulfonate, succinimide tosylsulfonate, succinimide trifluoromethylsulfonate, succinimide camphorsulfonate, phthalic imide trifluorosulfonate, cis-5-norbornene-end-2,3-dicarboxylic acid imide trifluoromethylsulfonate, benzoin tosylate, 1,2-diphenyl-2-hydroxypropyl tosylate, 1,2-di(4-methylmercaptophenyl)-2-hydroxypropyl tosylate, pyrogallol methylsulfonate, pyrogallol ethylsulfonate, 2,6-dinitrophenylmethyl tosylate, ortho-nitrophenylmethyl tosylate, and para-nitrophenyl tosylate.

In general, when a sulfonic acid derivative or a carboxylate is used, a heating step (50° C. to 100° C.) is preferably performed in order to release an acid.

Examples of onium salts that can be used in the present invention include sulfonium salts and iodonium salts having an anion such as tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), tetraphenylborate, tetrakis(trifluoromethylphenyl)borate, tetrakis(pentafluoromethylphenyl)borate, perchlorate ion ($ClO_4^-$), trifluoromethanesulfonic acid ion ($CF_3SO_3^-$), fluorosulfonic acid ion ($FSO_3^-$), toluenesulfonic acid ion, trinitrobenzenesulfonic acid anion, or trinitrotoluenesulfonic acid anion.

Examples of the sulfonium salts include triphenylsulfonium hexafluoroarsenate, triphenylsulfonium hexafluoroborate, triphenylsulfonium tetrafluoroborate, triphenylsulfonium tetrakis(pentafluorobenzyl)borate, methyldiphenylsulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexa hexafluoroantimonate, 4-butoxyphenyldiphenylsulfonium tetrafluoroborate, 4-butoxyphenyldiphenylsulfonium tetrakis(pentafluorobenzyl)borate, 4-chlorophenyldiphenylsulfonium hexafluoroantimonate, tris(4-phenoxyphenyl)sulfonium hexafluorophosphate, di(4-ethoxyphenyl)methylsulfonium hexafluoroarsenate, 4-acetylphenyldiphenylsulfonium tetrafluoroborate, 4-acetylphenyldiphenylsulfonium tetrakis(pentafluorobenzyl)borate, tris(4-thiomethoxyphenyl)sulfonium hexafluorophosphate, di(methoxysulfonylphenyl)methylsulfonium hexafluoroantimonate, di(methoxynaphthyl)methylsulfonium tetrafluoroborate, di(methoxynaphthyl)methylsulfonium tetrakis(pentafluorobenzyl)borate, di(carbomethoxyphenyl)methylsulfonium hexafluorophosphate, (4-octyloxyphenyl)diphenylsulfonium tetrakis(3,5-bis-trifluoromethylphenyl)borate, tris(dodecylphenyl)sulfonium tetrakis(3,5-bis-trifluoromethylphenyl)borate, 4-acetamide phenyldiphenylsulfonium tetrafluoroborate, 4-acetamide phenyldiphenylsulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis(pentafluorobenzyl)borate, phenylmethylbenzylsulfonium hexafluorophosphate, 10-methylphenoxathiinium hexafluorophosphate, 5-methylthianthrenium hexafluorophosphate, 10-phenyl-9,9-dimethylthioxanthenium hexafluorophosphate, 10-phenyl-9-oxothioxanthenium xanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate, and 5-methyl-10,10-dioxothianthrenium hexafluorophosphate. These may be used alone or in combinations of two or more.

Examples of the iodonium salts that can be used in the present invention include (4-n-desiloxyphenyl)phenyliodonium hexafluoroantimonate, [4-(2-hydroxy-n-tetradesiloxy)phenyl]phenyliodonium hexafluoroantimonate, [4-(2-hydroxy-n-tetradesiloxy)phenyl]phenyliodonium trifluorosulfonate, [4-(2-hydroxy-n-tetradesiloxy)phenyl]phenyliodonium hexafluorophosphate, [4-(2-hydroxy-n-tetradesiloxy)phenyl]phenyliodonium tetrakis(pentafluorophenyl)borate, bis(4-tert-butylphenyl)iodonium hexafluoroantimonate, bis(4-tert-butylphenyl)iodonium hexafluorophosphate, bis(4-tert-butylphenyl)iodonium trifluorosulfonate, bis(4-tert-butylphenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulfonate, di(dodecylphenyl)iodonium hexafluoroantimonate, di(dodecylphenyl)iodonium triflate, diphenyliodonium bisulfate, 4,4'-dichlorodiphenyliodonium bisulfate, 4,4'-dibromodiphenyliodonium bisulfate, 3,3'-dinitrodiphenyliodonium bisulfate, 4,4'-dimethyldiphenyliodonium bisulfate, 4,4'-bis-succinimidodiphenyliodonium bisulfate, 3-nitrodiphenyliodonium bisulfate, 4,4'-dimethoxydiphenyliodonium bisulfate, bis(dodecylphenyl)iodonium tetrakis(pentafluorophenyl)borate, (4-octyloxyphenyl)phenyliodonium tetrakis(3,5-bis-trifluoromethylphenyl)borate; (tolylcumyl)iodonium tetrakis(pentafluorophenyl)borate $(CH_3C_6H_4)_2I$—$(SO_2CF_3)_3$ disclosed in U.S. Pat. No. 5,554,664, $(C_6H_5)_2I$—$B(C_6F_5)_4$ disclosed in U.S. Pat. No. 5,514,728, and the salts disclosed in U.S. Pat. No. 5,340,898. These may be used alone or in combinations of two or more.

As other onium salts, aromatic diazonium salts can be used. For example, p-methoxybenzenediazonium hexafluoroantimonate and the like can be used.

Examples of commercially available onium salts that can be used in the present invention include San-Aid SI-60, SI-80, SI-100, SI-60L, SI-80L, SI-100L, SI-L145, SI-L150, SI-L160, SI-L110, and SI-L147 (all of which are manufactured by Sanshin Chemical Industry Co., Ltd.); UVI-6950, UVI-6970, UVI-6974, and UVI-6990 (all of which are manufactured by Union Carbide Corporation); Adeka Optomer SP-150, SP-151, SP-170, SP-171, and SP-172 (all of which are manufactured by Adeka Corporation); Irgacure 261 and Irgacure 250 (manufactured by Ciba Specialty Chemicals); CI-2481, CI-2624, CI-2639, and CI-2064 (all of which are manufactured by Nippon Soda Co., Ltd.); CD-1010, CD-1011, and CD-1012 (all of which are manufactured by Sartomer Company Inc.); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103, and BBI-109 (all of which are manufactured by Midori Kagaku Co., Ltd.); PCI-061T, PCI-062T, PCI-020T, and PCI-022T (all of which are manufactured by Nippon Kayaku Co., Ltd.); IBPF and IBCF (manufactured by Sanwa Chemical Co., Ltd.); CD1012 (manufactured by Sartomer Company Inc.); IBPF and IBCF (manufactured by Sanwa Chemical Co., Ltd.); BBI-101, BBI-102, BBI-103, and BBI-109 (all of which are manufactured by Midori Kagaku Co., Ltd.); UVE1014 (manufactured by General Electronics Co., Ltd.); RHODORSIL-PI2074 (manufactured by Rhodia); WPI-113 and WPI-114 (manufactured by Wako Pure Chemical Industries Ltd.).

Furthermore, diaryliodonium salts that can be produced by the methods described in J. Polymer Science: Part A: polymer Chemistry, Vol. 31, 1473-1482 (1993) and J. Polymer Science: Part A: polymer Chemistry, Vol. 31, 1483-1491 (1993) can also be used. The photoacid generators cited above may be used alone or in combinations of two or more.

In the case where the composition of the present application is used in an application in which a conductive property is required, for example, the composition of the present application is used for preparing an electrostatically assisted coatable composition, (4-octyloxyphenyl)diphenylsulfonium tetrakis(3,5-bis-trifluoromethylphenyl)borate, tris(dodecylphenyl)sulfonium tetrakis(3,5-bis-trifluoromethylphenyl)borate, bis(dodecylphenyl)iodonium tetrakis(pentafluorophenyl)borate, (4-octyloxyphenyl)phenyliodonium tetrakis(3,5-bis-trifluoromethylphenyl)borate, (tolylcumyl)iodonium tetrakis(pentafluorophenyl)borate, and the like are preferably used.

A composition including such a salt can impart sufficient conductivity to an electrostatically assisted coating material, and is suitably applied using electrostatic spraying, electric spraying, or continuous liquid application with electrostatic assistance (e.g., roller coating). In the case where such a salt is used, in general, a further conductivity-enhancing agent is not necessary, but may be used in combination with these preferable salts.

Since the composition of the present invention contains a photoacid generator, the composition is suitable for applications in which a heat-sensitive base material is used. In order to accelerate releasing of an acid, a sensitizer may be added. The amount of sensitizer added is not particularly limited, but is preferably 0.01 to 0.2 parts by weight relative to 100 parts by weight of a component (I). Preferable examples of the sensitizer that can be used in the present invention include the sensitizers described in Chapter 13 of Radiation Curing in Polymer Science and Technology, Vol. 2, edited by Fouassier and Rabek, Elsevier Science Publishers LTD, 1993.

Specific examples thereof include aromatic hydrocarbons such as anthracene, pyrene, and perylene; aromatic ketones such as benzophenone, xanthone, thioxanthone, Michler's ketone, and 9,10-phenanthraquinone; eosin, ketocoumarin, acridine dyes, aromatic amines, aromatic tertiary amines, coumarin, isobenzofuran, and derivatives of these.

The content of the photoacid generator in the composition of the present invention is not particularly limited, but, from the standpoint of curability, preferably 0.01 to 10.0 parts by weight, and from the standpoint of the balance of physical properties of cured products, further preferably 0.02 to 5.0 parts by weight relative to 100 parts by weight of the component (A). If the amount of photoacid generator is small, sufficiently cured products cannot be produced. An excessive amount of photoacid generator is also not preferable because a color of the photoacid generator remains in cured products, and rapid curing may cause coloration and degradation of heat resistance and light resistance.

The photoacid generator may be dissolved in an organic solvent and used as long as the effect of the photoacid generator is not impaired. Solvents that can uniformly dissolve the photoacid generator used and that have a boiling point in the range of 30° C. to 250° C. under the atmospheric pressure are preferable.

Specific examples thereof include n-pentane, i-pentane, n-hexane, i-hexane, n-heptane, i-heptane, 2,2,4-trimethylpentane, n-octane, i-octane, cyclohexane, methylcyclohexane, benzene, toluene, xylene, ethylbenzene, trimethylbenzene, methylethylbenzene, n-propylbenzene, propylbenzene, diethylbenzene, i-butylbenzene, triethylbenzene, di-i-propylbenzene, n-amylnaphthalene, trimethylbenzene, methanol, ethanol, n-propanol, i-propanol, n-butanol, i-butanol, sec-butanol, tert-butanol, n-pentanol, i-pentanol, 2-methylbutanol, sec-pentanol, tert-pentanol, 3-methoxybutanol, n-hexanol, 2-methylpentanol, sec-hexanol, 2-ethylbutanol, sec-heptanol, 3-heptanol, n-octanol, 2-ethylhexanol, sec-octanol, n-nonyl alcohol, 2,6-dimethyl-4-heptanol, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethylcyclohexanol, benzyl alcohol, phenyl methyl carbinol, diacetone alcohol, cresol, ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, triethylene glycol, tripropylene glycol, glycerin, acetone, methyl ethyl ketone, methyl-n-propyl ketone, methyl-n-butyl ketone, diethyl ketone, methyl-1-butyl ketone, methyl-n-pentyl ketone, ethyl-n-butyl ketone, methyl-n-hexyl ketone, di-1-butyl ketone, trimethyl nonanone, cyclohexanone, methylcyclohexanone, 2,4-pentanedione, acetonylacetone, diacetonealcohol, acetophenone, fenchone, ethyl ether, i-propyl ether, n-butyl ether, n-hexyl ether, 2-ethylhexyl ether, ethylene oxide, 1,2-propylene oxide, dioxolane, 4-methyl dioxolane, dioxane, dimethyl dioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycol mono-2-ethylbutyl ether, ethylene glycol dibutyl ether, diethylene glycol monomethyl ether, diethylene glycol monoethyl ether, diethylene glycol diethyl ether, diethylene glycol mono-n-butyl ether, diethylene glycol di-n-butyl ether, diethylene glycol mono-n-hexyl ether, ethoxytriglycol, tetraethylene glycol di-n-butyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, tripropylene glycol monomethyl ether, tetrahydrofuran, 2-methyltetrahydrofuran, diethyl carbonate, methyl acetate, ethyl acetate, γ-butyrolactone, γ-valerolactone, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, i-amyl propionate, diethyl oxalate, di-n-butyl oxalate, methyl lactate, ethyl lactate, n-butyl lactate, n-amyl lactate, diethyl malonate, dimethyl phthalate, diethyl phthalate, N-methylformamide, N,N-dimethylformamide, N,N-diethylformamide, acetamide, N-methylacetamide, N,N-dimethylacetamide, N-methylpropionamide, N-methylpyrrolidone, dimethyl sulfide, diethyl sulfide, thiophene, tetrahydrothiophene, dimethyl sulfoxide, sulfolane, and 1,3-propane sultone. These may be used alone or in combinations of two or more.

<Composition>

In the present invention, a composition of the present invention is cured by irradiation of active energy rays, the curing rate of the composition is very high, and thermal hysteresis can be suppressed. As a source of the active energy rays, ultraviolet rays, electron beams, and the like are exemplified. The intensity and the irradiation time of the active energy rays are arbitrarily set in accordance with the application and the production process. In the case where satisfactory curing is not performed by only irradiation of active energy rays, curing may be further carried out by subsequent annealing.

In addition to the above essential components, according to need, as an extending agent, a filler such as crushed quartz, calcium carbonate, or carbon may be added to the polysiloxane composition used in the present invention as an optional component as long as the advantages of the present invention are not impaired. Furthermore, various types of additives such as a coloring agent and a heat resistance improver, a reaction controlling agent, a mold-releasing agent, a dispersing agent for a filler, and the like may be optionally added to the polysiloxane composition of the present invention as required. Examples of the dispersing agent for a filler include diphenylsilanediol, alkoxysilanes, carbon-functional silanes, and silanol group-containing low-molecular-weight siloxanes.

Water may be added to the polysiloxane composition of the present invention as an optional component according to the application as long as the advantages are not impaired.

In order to impart flame retardancy and fire resistance to the polysiloxane composition of the present invention, a known additive such as titanium dioxide, manganese carbonate, $Fe_2O_3$, ferrite, mica, glass fiber, or glass flake may be added. Note that the amounts of these optional components added are preferably minimized so that the advantages of the present invention are not impaired.

The polysiloxane composition used in the present invention can be produced by uniformly mixing the above-described components using a kneading machine such as a roller, a Banbury mixer, or a kneader, or a planetary mixing deaerator, and performing a heat treatment according to need.

The polysiloxane composition of the present invention can be used as a formed body. As a forming method, any method such as extrusion, compressing molding, blow molding, calender forming, vacuum forming, foaming molding, injection molding, liquid injection molding, or cast molding can be employed. Formed bodies obtained from the polysiloxane composition according to the present invention are excellent in heat resistance and light resistance, and exhibit high transparency to light of a wavelength in the near-ultraviolet region of about 400 nm.

The polysiloxane composition of the present invention can be used as a composition for an optical material. The term "optical material" used herein means a material in general used in applications in which light such as visible light, infrared rays, ultraviolet rays, X-rays, or laser can pass through the material. Specific examples of applications of the composition obtained by the present invention include the following.

Examples of applications in the field of display materials include:

substrate materials, color filters, black matrixes, light guide plates, prism sheets, polarizers, retardation films, viewing-angle correction films, adhesives, passivation films, and polarizer protective films in peripheral materials of liquid crystal display devices;

sealing agents, antireflection films, optical correction films, housing materials, protective films of front glasses, alternative materials for front glasses, color filters, adhesives, and passivation films in color plasma displays (PDP);

molding materials, protective films of front glasses, alternative materials for front glasses, adhesives, color filters, and passivation films in LED elements used in LED display devices;

substrate materials, color filters, light guide plates, prism sheets, polarizers, retardation films, viewing-angle correction films, adhesives, passivation films, and polarizer protective films in plasma addressed liquid crystal (PALC) displays;

protective films of front glasses, color filters, alternative materials for front glasses, adhesives, and, passivation films in organic electroluminescence (EL) displays;

various types of film substrates, color filters, protective films of front glasses, alternative materials for front glasses, adhesives, and passivation films in field emission displays (FED); and projector lenses, protective films, sealing agents, and adhesives in projection televisions.

Examples of applications further include materials for lenses, sealing materials, adhesives, and films used in optical sensing devices.

Examples of applications in the field of optical recording include pickup lenses, protective films, sealing agents, adhesives, disc substrate materials for a video disc (VD), CD/CD-ROM, CD-R/RW, DVD-R/DVD-RAM, MO/MD, a phase-change disc (PD), or an optical card, and the like.

Examples of applications in the field of optical apparatuses include materials for lenses, finder prisms, target prisms, finder covers, and photo-detector portions of still cameras. Examples of applications further include taking lenses, finders, and the like of video cameras.

Examples of applications in the field of optical components include fiber materials, lenses, waveguides, sealing agents of elements, and adhesives used around optical switches in optical communication systems. Examples thereof further include optical fiber materials, ferrules, sealing agents, and adhesives used around optical connectors. Examples thereof include lenses, waveguides, sealing agents of LED elements, and adhesives in optical passive components and optical circuit components. Examples thereof include substrate materials, fiber materials, sealing agents of elements, and adhesives used around opto-electronic integrated circuits (OEIC).

Examples of applications in the field of optical fibers include illuminations/light guides for decorative displays, sensors and displays/indicators for industrial applications, and optical fibers for communication infrastructures and for connection with home digital devices.

Examples of applications in the field of peripheral materials of semiconductor integrated circuits include interlayer insulation films and resist materials used in microlithography for LSI and VLSI materials.

Examples of applications in the field of automobiles/transports include lamp reflectors, bearing retainers, gear portions, corrosion-resistance coatings, switch portions, head lamps, components in engines, electrical components, various interior and exterior components, drive engines, brake oil tanks, rust-proof steel sheets for automobiles, interior panes, interior materials, protecting/bundling wire harnesses, fuel hoses, automotive lamps, and glass alternatives for automobiles.

Examples of applications also include multiple glass for railway vehicles. Examples of applications further include toughness-imparting agents, peripheral members of engines, protecting/bundling wire harnesses, and corrosion-resistance coatings of structural materials of aircraft.

Examples of applications in the field of building include interior processing materials, electrical covers, sheets, glass intermediate layers, alternatives for glasses, and peripheral material of solar cells. Examples of applications in agriculture include house coating films.

Examples of next-generation optical/electronic functional organic materials include next-generation DVD and organic EL element peripheral materials; and substrate materials, fiber materials, sealing agents of elements, and adhesives used around organic photorefractive elements, light amplifying elements functioning as light-light conversion devices, optical computing elements, and organic solar cells.

EXAMPLES

Next, compositions of the present invention will be described in more detail on the basis of Examples, but the present invention is not limited to these Examples.

Production Example 1

A mixed solution containing 3 g of octa(vinyldimethylsiloxy)octasilsesquioxane which is an alkenyl group-containing polysiloxane having a polyhedral skeleton, 9 g of toluene, and 15 µL of a platinum-vinylsiloxane complex (3% platinum, xylene solution) was gradually added dropwise to a mixed solution containing 3 g of methyldimethoxysilane and 6 g of toluene. After the dropwise addition, the resulting mixture was reacted at room temperature for one hour, and the solvent was then distilled off. Thus, 4 g of octa[(dimethoxymethylsilyl)ethyldimethylsiloxy]octasilsesqui oxane (Compound A) was obtained.

Example 1

A 2-acetoxy-1-methoxypropane 50 wt % solution (0.02 g) of RHODORSIL-PI2074 (photoacid generator, manufactured by Rhodia) was added to the Compound A (2 g) obtained in Production Example 1. A composition thus obtained was applied to a glass substrate and irradiated for 50 seconds using a radiation irradiation device (manufactured by Eye Graphics Co., Ltd., irradiation distance: 80 mm, with a 3,000 W metal halide lamp). Thus, a polysiloxane film having a thickness of 100 µm was prepared on the glass substrate. The resulting polysiloxane film had good transparency, and the light transmittance of the glass test piece was measured with an ultraviolet-visible spectrophotometer (V-560 manufactured by JASCO Corporation). The polysiloxane film had a transmittance of 90% or more over the entire visible region (400 to 800 nm).

Example 2

Optomer SP-172 (photoacid generator, manufactured by Adeka Corporation) (0.03 g) was added to the Compound A (2 g) obtained in Production Example 1. A composition thus obtained was applied to a glass substrate and irradiated for 50 seconds using a radiation irradiation device (manufactured by Eye Graphics Co., Ltd., irradiation distance: 80 mm, with a 3,000 W metal halide lamp). Thus, a polysiloxane film having a thickness of 95 µm was prepared on the glass substrate. It was confirmed by visual observation that the resulting polysiloxane film had good transparency. The polysiloxane film had good transparency, and the light transmittance of the glass test piece was measured with an ultraviolet-visible spectrophotometer (V-560 manufactured by JASCO Corporation). The polysiloxane film had a transmittance of 90% or more over the entire visible region (400 to 800 nm).

Production Example 2

A mixed solution containing 5 g of octa(vinyldimethylsiloxy)octasilsesquioxane, 15 g of toluene, and 2 µL of a platinum-vinylsiloxane complex (Pt-VTSC-3.0×, manufactured by N.E. Chemcat Corporation) was gradually added dropwise to a mixed solution containing 2.4 g of methyldimethoxysilane, 2.3 g of H-terminated polydimethylsiloxane (DMS-H03, manufactured by Gelest Inc.), 1.7 g of H-terminated polydimethylsiloxane (DMS-H21, manufactured by Gelest Inc.), and 15 g of toluene. After the dropwise addition, the resulting mixture was reacted at room temperature for one hour, and the solvent was then distilled off. Thus, 10.4 g of Compound A was obtained.

Example 3

A propylene glycol monomethyl ether acetate (PGMEA) 10 wt % solution (0.1 g) of RHODORSIL-PI2074 (diaryliodonium salt) (photoacid generator, manufactured by Rhodia) and toluene (2 g) was added to the Compound A (2 g) obtained in Production Example 2 to prepare a polysiloxane composition. The composition thus obtained was applied to a glass substrate by spin-coating at 4,000 rpm for 60 seconds, and irradiated with ultraviolet rays using a radiation irradiation device (LC-6B, manufactured by Fusion UV Systems Japan K.K., irradiation distance: 53.3 mm, integrated amount of light: 240 mJ/cm$^2$).

Thus, a polysiloxane film having a thickness of 1.3 µm was prepared on the glass substrate. The resulting polysiloxane film had good transparency, and the transmittance of the polysiloxane film was measured with an ultraviolet-visible spectrophotometer (V-560 manufactured by JASCO Corporation). The polysiloxane film had a transmittance of 90% or more over the entire visible region (400 to 800 nm). In addition, the polysiloxane film has good heat resistance. Even after the polysiloxane film was placed in a nitrogen flow atmosphere at 350° C. for one hour, a change in the appearance (coloring or cracking of the film) was not visually observed, and the transmittance was 90% or more over the entire visible region and was 92% at a wavelength of 400 nm.

Comparative Example 1

A PGMEA 10 wt % solution (0.1 g) of RHODORSIL-PI2074 (diaryliodonium salt) (photoacid generator, manufactured by Rhodia) was added to an oxetane compound (Aron Oxetane OXT-121, manufactured by TOAGOSEI Co., Ltd.) (2 g) to prepare a composition. This composition was applied to a glass substrate by spin-coating at 3,000 rpm for 60 seconds, and irradiated with ultraviolet rays using a radiation irradiation device (LC-6B, manufactured by Fusion UV Systems Japan K.K., irradiation distance: 53.3 mm, integrated amount of light: 240 mJ/cm$^2$). Thus, a cured product film having a thickness of 8 µm was prepared on the glass substrate. The resulting film had a transmittance of 90% or more over the entire visible region, and had a transmittance of 94% at a wavelength of 400 nm. When the film was placed in a nitrogen flow atmosphere at 350° C. for one hour, the color of the film turned to brown. The transmittance was 65% or less over the entire visible region and was 10% at a wavelength of 400 nm.

Comparative Example 2

A PGMEA 10 wt % solution (0.1 g) of RHODORSIL-PI2074 (diaryliodonium salt) (photoacid generator, manufactured by Rhodia) was added to an alicyclic epoxy compound (Celloxide 2021P, manufactured by Daicel Chemical Industries Ltd.) (2 g) to prepare a composition. This composition was applied to a glass substrate by spin-coating at 3,000 rpm for 60 seconds, and irradiated with ultraviolet rays using a radiation irradiation device (LC-6B, manufactured by Fusion UV Systems Japan K.K., irradiation distance: 53.3 mm, integrated amount of light: 240 mJ/cm$^2$). Thus, a cured product film having a thickness of 10 μm was prepared on the glass substrate. The resulting film had a transmittance of 90% or more over the entire visible region, and had a transmittance of 96% at a wavelength of 400 nm. When the film was placed in a nitrogen flow atmosphere at 350° C. for one hour, the color of the film turned to dark brown. The transmittance was 35% or less over the entire visible region and was 14% at a wavelength of 400 nm.

These results show that the compositions of the invention of this application have high transparency, are formed into formed bodies having excellent heat resistance and light resistance, and are particularly useful as optical members that require heat resistance.

The invention claimed is:

1. A polysiloxane composition comprising:
   (A) a polysiloxane which is a polysiloxane compound having a polyhedral skeleton and which has at least one group containing a hydrolyzable silyl group bonded to a Si atom constituting the polyhedral skeleton; and
   (B) a photoacid generator,
      wherein the hydrolyzable silyl group in component (A) is selected from the group consisting of an alkoxysilyl group, an acetoxysilyl group and a halogenated silyl group.

2. The polysiloxane composition according to claim 1, wherein the polysiloxane compound (A) having the polyhedral skeleton is a polysiloxane compound having a polyhedral skeleton having 6 to 24 Si atoms in its molecule.

3. The polysiloxane composition according to claim 1, wherein the hydrolyzable silyl group in the component (A) is an alkoxysilyl group.

4. The polysiloxane composition according to claim 3, wherein the group containing a hydrolyzable silyl group in the component (A) is an alkoxysilylethyl group or an alkoxysilylpropyl group.

5. The polysiloxane composition according to claim 3, wherein the group containing a hydrolyzable silyl group in the component (A) is at least one group containing an alkoxysilyl group selected from the group consisting of an (alkoxysilylethyl)dimethylsilyl group, an (alkoxysilylethyl)diphenylsilyl group, an (alkoxysilylpropyl)dimethylsilyl group, and an (alkoxysilylpropyl)diphenyl group.

6. The polysiloxane composition according to claim 1, wherein the polysiloxane compound (A) having the polyhedral skeleton is obtained by reacting a polyhedral-structured polysiloxane compound having functional groups that can react with components (1) and (2) below,
   (1) a compound having one functional group that can react with the functional groups of the polyhedral-structured polysiloxane compound and at least one hydrolyzable silyl group, and
   (2) a compound that has two or more functional groups that can react with the functional groups of the polyhedral-structured polysiloxane compound.

7. The polysiloxane composition according to claim 1, wherein the polyhedral-structured polysiloxane compound in the component (A) is a polyhedral-structured silylated silicic acid compound.

8. The polysiloxane composition according to claim 6, wherein each of the functional groups that can react with components (1) and (2) in the polyhedral-structured polysiloxane compound is an alkenyl group or a hydrosilyl group.

9. The polysiloxane composition according to claim 6, wherein the hydrolyzable silyl group in the component (1) is an alkoxysilyl group.

10. The polysiloxane composition according to claim 6, wherein the functional groups that can react with the polyhedral-structured polysiloxane compound in the component (2) are bonded to both ends of the compound.

11. The polysiloxane composition according to claim 6, wherein the component (2) is at least one selected from the group consisting of polyalkylenes, polyisobutylene, polyesters, polybutyl acrylate, polyethers, polyamides, polyimides, and polysiloxanes.

12. The polysiloxane composition according to claim 6, wherein a reaction between the polyhedral-structured polysiloxane compound and the components (1) and (2) is conducted by a hydrosilylation reaction.

13. The polysiloxane composition according to claim 1, wherein the photoacid generator is an onium salt.

14. An optical member comprising the polysiloxane composition according to claim 1.

* * * * *